Figure 1:
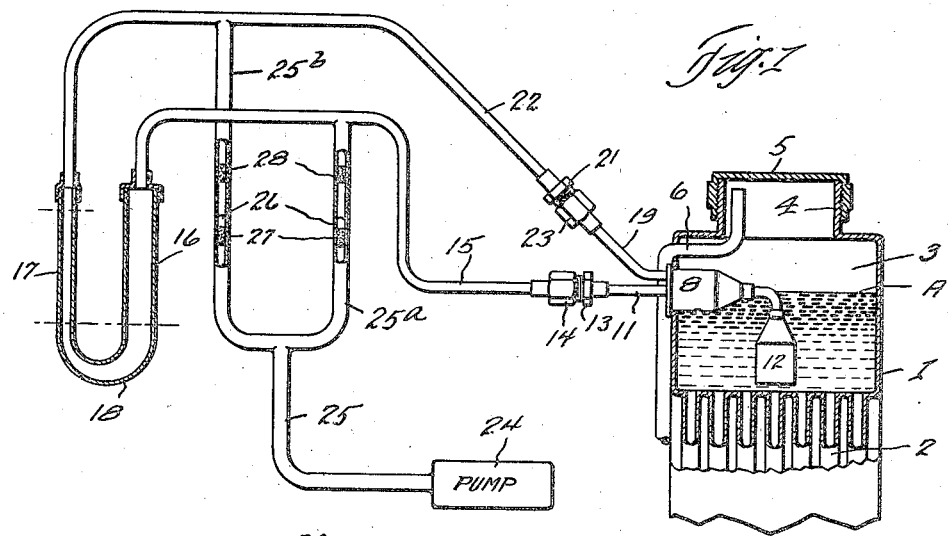

July 14, 1931.  E. L. BEECHER  1,815,001
LIQUID LEVEL INDICATOR
Filed April 5, 1929

Inventor
Eugene L. Beecher,
By Hull, Brock & West
Attorneys

Patented July 14, 1931

1,815,001

UNITED STATES PATENT OFFICE

EUGENE L. BEECHER, OF CLEVELAND, OHIO, ASSIGNOR TO THE GABRIEL COMPANY, OF CLEVELAND, OHIO, A CORPORATION OF OHIO

LIQUID LEVEL INDICATOR

Application filed April 5, 1929. Serial No. 352,630.

This invention relates to systems for indicating the levels of liquid supplies and, in the form shown herein, is particularly designed and adapted for the purpose of indicating the height of liquid in receptacles such as the radiators of water-cooled automobiles. It is the general purpose and object of the invention to provide a system of this connection which, in the case of such a radiator or like liquid-containing receptacle, will enable the height or level of an intermediate predetermined depth of liquid in the space above the radiator core to be accurately indicated, as well as to enable any deficiency in such depth to be indicated. A further and more limited object of the invention is to provide, for a system of this character, a type of fitting or connection which is adapted to be inserted into the upper portion of a radiator or like receptacle and which will enable the former objects to be realized economically, conveniently and efficiently.

As is well known, after an automobile radiator has been filled completely and the engine has been run for a short period of time, the level of the water above the radiator core is considerably lower than the level immediately after such filling operation. For convenience of description, the level of the water after the filling of the radiator and the running of the engine for a short period of time will be referred to as the normal level. This level is always above the radiator core and, in some instances, may be as much as two inches below the top of the radiator overflow pipe, it being recognized that the danger point to the radiator is reached when the water level falls to the top of such core.

In the use of my system, I connect up the indicating device thereof with the space above a radiator core in such manner that the said device will indicate the depth of the water above the core and up to the aforesaid normal level, but any water in the radiator above such level will have no effect upon the indicating device. By constructing and using my system in this manner, there will be no fluctuation in the indicating device due to the action of the water pump in forcing various amounts of water into the top of the radiator in accordance with varying engine speeds. Furthermore, there will be no fluctuation due to centrifugal action when rounding curves at high speed, which tends to throw the water to one side of the radiator, thereby raising or lowering the level at the side of the radiator to which the system is connected. A further advantage of my system and its mode of installation is that it eliminates the use of an extra long indicating column in a liquid-column indicating device in order to take care of the head of water in the radiator when the latter is refilled; it also takes care of pressure which may be generated in the radiator due to steam, which would otherwise add to the hydrostatic head and thus result in a false reading of the indicating device and in a possible forcing of the indicating liquid out of the manometer or U-tube.

Figure 2:
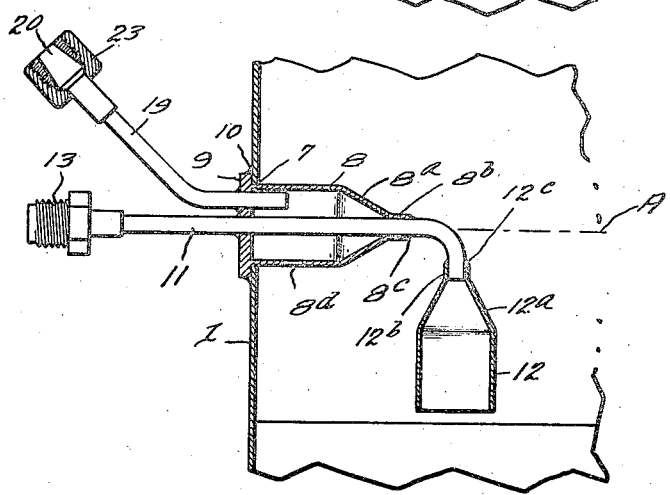

I secure the advantages and overcome the disadvantages referred to hereinbefore in and through the construction and arrangement of parts shown in the drawings wherein Fig. 1 represents a diagrammatic sectional elevation of a radiator of an automobile engine having my system connected therewith; and Fig. 2 a detail in sectional elevation illustrating a special fitting for effecting an operative connection between the hydrostatic conduits of my system and the radiator.

Describing the parts by reference characters, 1 denotes generally the radiator shell having the core 2 therein and provided above said core with a water-containing chamber or receptacle 3, the radiator having at the top of said chamber the usual filling connection 4 and being provided with a cap 5 and the usual overflow pipe 6.

Projecting through an aperture 7 in the side of the radiator above the core is a horizontally extending cylindrical air-chamber casing or bell 8, adapted to fit more or less snugly the wall of the opening 7 and provided with a head 9 adapted to engage the outer surface of the radiator surrounding the said opening and to be secured thereto, as by means of solder, indicated at 10. The casing 8 is provided with a frusto-conical extension 8ª at the end of which is a short sleeve 8ᵇ adapted to fit snugly about a pipe 11 which extends through the center of the head 9 and has its inner end bent downwardly and projected into a neck 12ᵇ similar to the neck 8ᵇ and carried by the frusto-conical extension 12ª of an air-chamber casing or bell 12. The pipe 11 is secured to the necks 8ᵇ and 12ᵇ by means of solder, indicated at 8ᶜ and 12ᶜ, respectively. The casing 8 is provided with an opening 8ᵈ located below the normal level A and is shown as applied to the side wall of the radiator in such manner that the opening is at the bottom of the casing. It will be noted that the bottom of the bell formed by the parts 12, 12ª, is slightly above the radiator core 2.

The outer end of the pipe 11 is provided with a threaded nipple 13, by means of which and a gland nut 14, the adjacent end of a hydrostatic conduit 15 is secured thereto, the opposite end of the conduit being connected with the upper end of the rear leg 16 of a liquid-containing indicating gauge, the front or indicating leg of which is indicated at 17, the said legs being connected by a U-bend 18. The pipe 15 and the bell 12 constitute an extension of a hydrostatic conduit which transmits the pressure due to the head of liquid between the bottom of the casing 8 and the bottom of the bell 12 to the top of the liquid in the leg 16 of the indicator.

19 denotes a short pipe which is shown as extending through the upper part of the head 9 and into the interior of the casing 8 and having at its outer end a tapered nipple 20 to which is fitted the adjacent end of a coupling 21 on a hydrostatic conduit 22, the coupling 21 being secured in proper relation to the nipple by means of a gland nut 23, this being also the preferred manner of connecting the parts 11 and 15. The conduit 22 extends to the top of the gauge glass 17, and the pipe 19 and the casing 8 constitute an extension of a hydrostatic conduit which extends to the upper end of said gauge glass and subjects the liquid therein to the head of liquid in the radiator above the opening 8ᵈ in the casing 8.

The fitting comprising the air-chamber casings or bells 8 and 12 and the pipes 11 and 19, forms a convenient and effective means for connecting the external pipes of the hydrostatic conduits to the radiator shell; while the casings or bells 8 and 12 provide expansion chambers which prevent the indicating device from being affected by temperature variations.

For the purpose of clearing the conduits 15, 11 and 12 and 22, 19 and 8 of liquid which may enter the bottoms of the casings 8 and 12, I connect each of these conduits with a pump 24, which pump will be of any approved type capable of forcing air through the said conduits, thereby to eliminate therefrom any liquid which may enter the same and to make and maintain an unbroken column of air throughout each of said conduits. This connection between the pump and the conduits may be made in the manner indicated herein; that is to say by a conduit 25 extending from the pump and having a branch 25ª connected with the conduit 15 and another branch 25ᵇ connected with the conduit 22. Each of the conduits 25ª and 25ᵇ is provided with a mercury check valve 26, with a seat 27 of porous material below each such valve, and a dam 28, also of suitable porous material, above each valve.

With the parts constructed and arranged as described the operation of the system will be readily understood. For any height of liquid in the chamber 3 above the opening 8ᵈ, the height of the column in the gauge glass 17 will be the same, due to the conduit 22 and 19 which serves as a balancing or equalizing line, preventing the indicating column from being affected by variations in pressure above such opening, such variations in pressure being due to variations in the head of liquid above such opening as well as to the pressure of steam upon the surface of the liquid when above such opening. However, the column in the glass 17 will respond to all variations in the level of the water in the chamber 3 between the opening 8ᵈ and the bottom of the bell 12, as the top of the column in such cases will usually be subjected only to atmospheric pressure through the conduit 22, 19.

By placing the opening 8ᵈ below the normal level A, this opening will not be uncovered when the vehicle is rounding a curve at high speed in a direction to lower the said level on the side of the radiator to which said opening is adjacent.

Having thus described my invention, what I claim is:

In a system for indicating variations of the level of the liquid in a receptacle and comprising an indicating device of the U-tube type containing an indicating liquid, a conduit connected at one end with one of the branches of said device and a conduit connected at one end to the other branch of the said device, a fitting for placing the opposite ends of the conduits in communication with the liquid in said receptacle, the said fitting comprising a cylindrical, pointed, horizontally extending, air chamber sealed through a wall of said receptacle, said air chamber having a relatively small opening in the bottom thereof and one of said conduits being sealed through the wall thereof which projects outside said receptacle, the air chamber being otherwise air tight, the other of said conduits being sealed through the wall of said chamber outside said receptacle and through the pointed portion and being bent downwardly and terminating in a flaring portion below the bottom of said air chamber.

In testimony whereof, hereunto affix my signature.

EUGENE L. BEECHER.